Figures 1, 2:
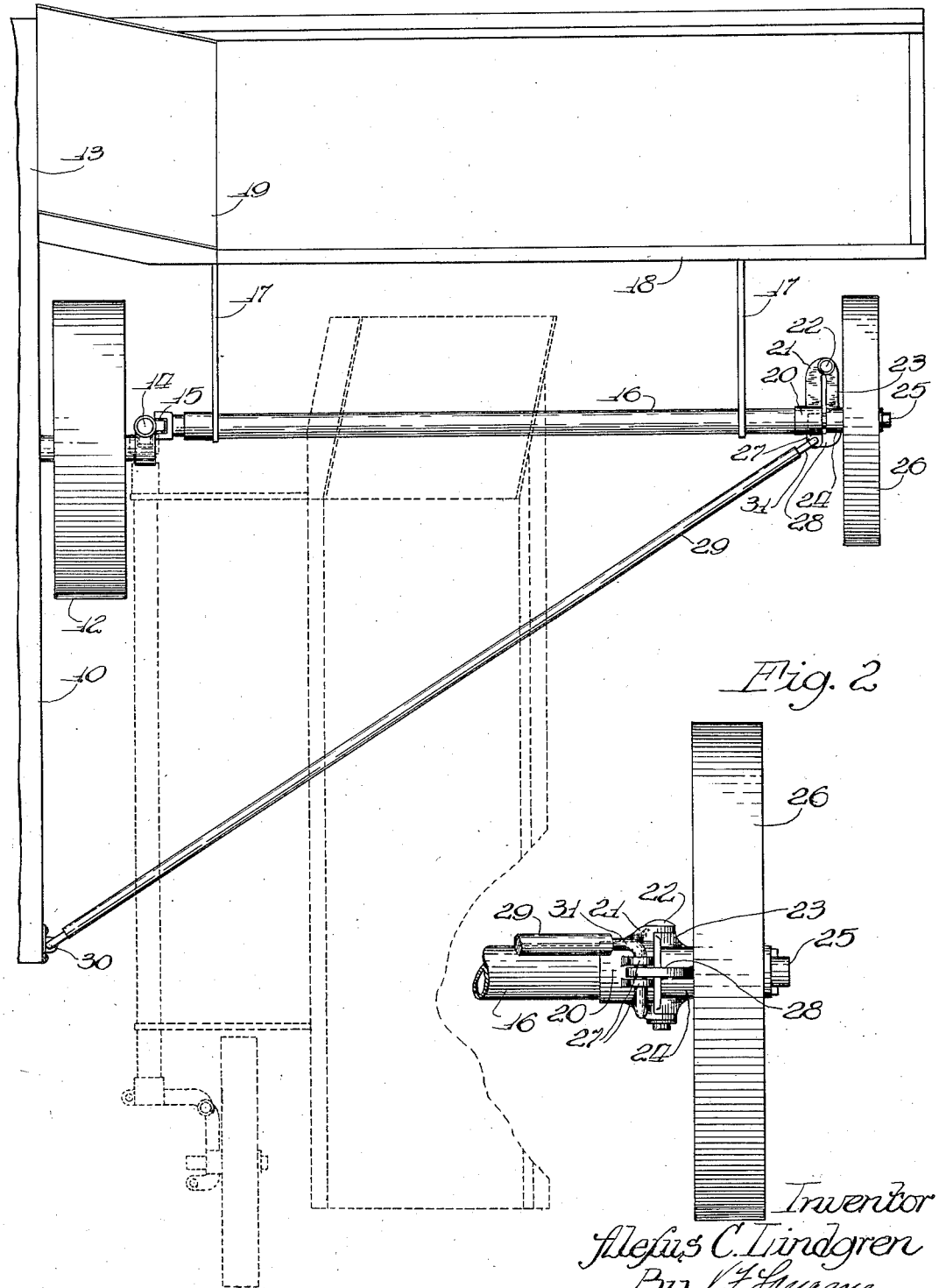

Aug. 6, 1935.  A. C. LINDGREN  2,010,096
HARVESTER THRESHER
Filed May 5, 1934

Inventor
Alesus C. Lindgren
By V. F. Sturgue
Atty.

Patented Aug. 6, 1935

2,010,096

UNITED STATES PATENT OFFICE 2,010,096

HARVESTER THRESHER

Alexus C. Lindgren, Chicago, Ill., assignor to International Harvester Company, a corporation of New Jersey Application May 5, 1934, Serial No. 724,142

8 Claims. (Cl. 56—322)

The invention relates to harvester threshers, and particularly to a combined grain and castering wheel for supporting the free end of the harvester support.

Harvester threshers comprise a longitudinal thresher part, from which extends a transverse harvester support carried at its outer end by a so-called grain wheel. The support is flexibly associated with the thresher, whereby the support and harvester may be folded from its normal transverse position to a longitudinal position closely alongside the thresher, to narrow the machine for transport through and over narrow places. In the normal cutting position the grain wheel must be fixed against castering, whereas in the trailing transport position the wheel must be released to enable it to caster freely.

The objects of the present invention are to provide an improved form of latching and unlatching means for the grain wheel, such means being simple and effective to facilitate the conversion of the wheel from fixed to castering positions.

Another object is to utilize the usual diagonal brace bar between the harvester support and thresher as the latching means for holding the wheel against castering when the harvester is in its transverse cutting position.

Other objects will be apparent to those skilled in the art as the disclosure is more fully made.

Briefly, these desirable objects may be attained in the preferred example of the invention herein shown by forming a hook on the forward end of the said diagonal brace bar and using such hook to latch the grain wheel yoke to the outer end of the harvester support. When the brace is removed to permit folding of the support, the wheel becomes unlatched to permit it to caster.

In the drawing:

Figure 1 is a fragmentary plan view of a harvester thresher showing the harvester, its support, and grain wheel in normal position in full lines, and in the folded transport position in dotted lines; and, Figure 2 is a detail, rear elevational view of the outer end of the harvester support and the wheel latched thereto against castering.

The harvester thresher shown is of any conventional type having a longitudinally disposed thresher part 10 carried on a transverse axle 11 and a pair of main wheels, one of which is shown at 12. A feed housing 13 is located in advance of the thresher.

The axle 11 extends grainwardly of the wheel 12 a short distance and carries a vertical hinge pin element 14 to which is connected a horizontal, longitudinal hinge pin 15, the two pins in effect constituting a universal joint. Connected to this universal joint is a normally transversely extending harvester support, or axle element, 16, carrying forwardly extending line bars 17 supporting in the usual way the harvester platform 18, at the stubbleward end of which is carried an elevator 19 for loading the cut grain from the platform, in the usual way, into the feeder housing 13.

Secured to the free end of the support 16 is a sleeve 20 including a normally forwardly extending arm 21 carrying at its front end a vertical hinge pin 22, to which is pivotally connected a rearwardly extending bifurcated bracket 23 including a transverse journal 24 for supporting a stub axle 25 in turn carrying the combination wheel 26. As shown in Figure 1, the axle 25 extends stubblewardly a short distance into the sleeve 20. The rear face of the sleeve 20 carries a pair of spaced ears 27 having vertically registering holes, and the rear face of the journal 24 has a rearwardly and stubblewardly extending flat boss 28 that has a hole also adapted to register with the holes in the ears 27.

A diagonal brace 29 is detachably connected at one end to the thresher at 30, while at its other end the brace has connected to it a hook or vertical pin extension 31 adapted to be inserted through the holes in the ears 27 and boss 28 to lock the wheel bracket 23 and make the hinge 22 ineffective. Thus, the wheel 26 cannot caster as it is latched against such movement about its hinge 22. In this normal cutting position, the axes of the support 16 and shaft 25 are in alignment to make the wheel turn smoothly.

In normal or cutting operation, the parts are as shown in full lines in Figure 1, where the brace bar 29 is in position to hold the harvester in transverse position; the pin 31 latching the wheel, through the parts 27, 28, to the support sleeve 20 to prevent castering of the wheel 26 about its castering pivot 22.

When the machine is to be narrowed for transport, the brace 29 is disconnected at 30 from the thresher 10 and at its other end the pin or hook 31 thereof is removed, by lifting the same, from the ears 27 and boss 28. The wheel 26 is thus freed for castering movement about the hinge 22. With the brace 29 so removed, the support 16 may now be folded horizontally rearwardly from the full line transverse position shown in Figure 1 to the longitudinal, dotted line position therein shown. The harvester platform 18 and elevator 19 also move back with the support, as shown. While the support is so being moved, or folded back, the wheel 26, of course, remains connected to the support to carry the load of the platform and support. When the folded machine is now drawn ahead, the wheel 26 assumes the trailing, castering position shown in the dotted lines in Figure 1. Any suitable means, not shown, can be used to hold the support 16 in the longitudinal position, such, for example, as a tie rod connected between the support and thresher 10.

From this disclosure it can now be seen that the diagonal brace bar 29 serves the dual function of bracing the support 16 and latching the wheel 26 against castering. This is a very convenient arrangement, as both the brace and latch must be operative during cutting; and, vice versa, both are displaced simultaneously when preparing the machine for transport.

It is the intention to cover all changes and modifications not departing from the scope of the invention as defined in the appended claims.

What is claimed is:

1. In a machine having a longitudinally disposed body, a transversely disposed support hingedly associated therewith for folding movement to a substantially longitudinal position alongside the body, a wheel carrying the free end of the support and hingedly connected thereto for castering movement when the support is folded, a diagonal brace bar detachably connected between the body and support, and means connected with the brace bar and forming a portion thereof for latching the wheel against castering movement.

2. In a machine having a longitudinally disposed body, a transversely disposed support hingedly associated therewith for folding movement to a substantially longitudinal position alongside the body, a wheel carrying the free end of the support and hingedly connected thereto for castering movement when the support is folded, and a brace for holding the support in transverse position, said brace including means to latch the wheel against castering movement.

3. In a machine having a longitudinally disposed body, a transverse disposed support hingedly associated therewith for folding movement to a substantially longitudinal position alongside the body, a wheel carrying the free end of the support and hingedly connected thereto for castering movement when the support is folded, and means for performing the dual function of holding the support in transverse position and locking the wheel against castering movement.

4. In a machine having a longitudinally disposed body, a transversely disposed support hingedly associated therewith for folding movement to a substantially longitudinal position alongside the body, a wheel carrying the free end of the support and hingedly connected thereto for castering movement when the support is folded, and a single member detachably connected between the body and support to hold the support in transverse position and to latch the wheel against castering movement.

5. In a harvester thresher having a longitudinally disposed thresher, a transversely disposed harvester support hingedly connected to the thresher for folding movement to a substantially longitudinal position alongside the thresher, a wheel carrying the grainward end of the support and hingedly connected thereto for castering movement when the support is folded, and a common member for bracing the support in its transverse position and latching the wheel against castering movement.

6. In a harvester thresher having a longitudinally disposed thresher, a transversely disposed harvester support hingedly connected to the thresher for folding movement to a substantially longitudinal position alongside the thresher, a wheel carrying the grainward end of the support and hingedly connected thereto for castering movement when the support is folded, and a brace detachably connected between the thresher body and support to hold the support in its transverse position and latch the wheel against castering movement.

7. In a harvester thresher having a longitudinally disposed thresher, a transversely disposed harvester support hingedly connected to the thresher for folding movement to a substantially longitudinal position alongside the thresher, a sleeve including a forwardly extending arm connected to the free end of the support, a bracket pivotally connected to the arm, a wheel journaled on the bracket to carry the support, and a brace between the thresher and sleeve to hold the support in transverse position, said brace having means to lock the bracket against pivoting movement to hold the wheel from castering movement.

8. In a harvester thresher having a longitudinally disposed thresher, a transversely disposed harvester support hingedly connected to the thresher for folding movement to a substantially longitudinal position alongside the thresher, a sleeve including a forwardly extending arm connected to the free end of the support, a bracket pivotally connected to the arm, a wheel journaled on the bracket to carry the support, an ear on the sleeve having a hole therein, a boss on the bracket adapted to lie adjacent the ear and having a registering hole therein, and a brace between the thresher and sleeve to hold the support in transverse position, said brace having a hook at one end to be passed through the ear and boss to lock the bracket against pivotal movement to hold the wheel from castering movement.

ALEXUS C. LINDGREN.